(12) United States Patent
Pannell

(10) Patent No.: US 6,510,138 B1
(45) Date of Patent: Jan. 21, 2003

(54) NETWORK SWITCH WITH HEAD OF LINE INPUT BUFFER QUEUE CLEARING

(75) Inventor: Donald Robert Pannell, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/258,181

(22) Filed: Feb. 25, 1999

(51) Int. Cl.[7] .............................................. H04L 12/56
(52) U.S. Cl. ...................... 370/236; 370/415; 370/429
(58) Field of Search ................................. 370/230, 231, 370/235, 236, 357, 360, 400, 410, 412, 415, 416, 428, 429; 340/2.1, 2.2, 2.28, 14.1; 709/232, 234, 235, 238

(56) References Cited

U.S. PATENT DOCUMENTS

| | | | |
|---|---|---|---|
| 5,475,680 A | * 12/1995 | Turner | 370/60 |
| 5,689,644 A | 11/1997 | Chou et al. | 395/200.06 |
| 5,784,003 A | 7/1998 | Dahlgren | 340/825.79 |
| 5,838,684 A | * 11/1998 | Wicki et al. | 370/416 |
| 6,208,644 B1 | * 3/2001 | Pannell et al. | 370/389 |
| 6,212,194 B1 | * 4/2001 | Hsieh | 370/414 |
| 6,230,229 B1 | * 5/2001 | Van Krevelen et al. | 710/131 |

* cited by examiner

*Primary Examiner*—Alpus H. Hsu
(74) *Attorney, Agent, or Firm*—Daniel J. Bedell; Smith-Hill and Bedell

(57) ABSTRACT

An improvement is provided to a network switch of the type including a set of input and output ports for receiving and forwarding data transmissions from and to network stations and a crosspoint switch for selectively routing data transmissions between the input and output ports. Each input port stores successive incoming data transmissions in an input buffer queue. When a data transmission reaches the head of the queue, the input port requests a route through the crosspoint switch to an output port that is to forward the transmission to a network station. When the output port is ready to receive the transmission the crosspoint switch establishes the route and the input port forwards the data transmission from its buffer queue to the output port. In the improved network switch, the input port discards the data transmission at the head of the buffer queue without forwarding it to an output port when necessary to make room in the buffer for incoming transmissions.

7 Claims, 6 Drawing Sheets

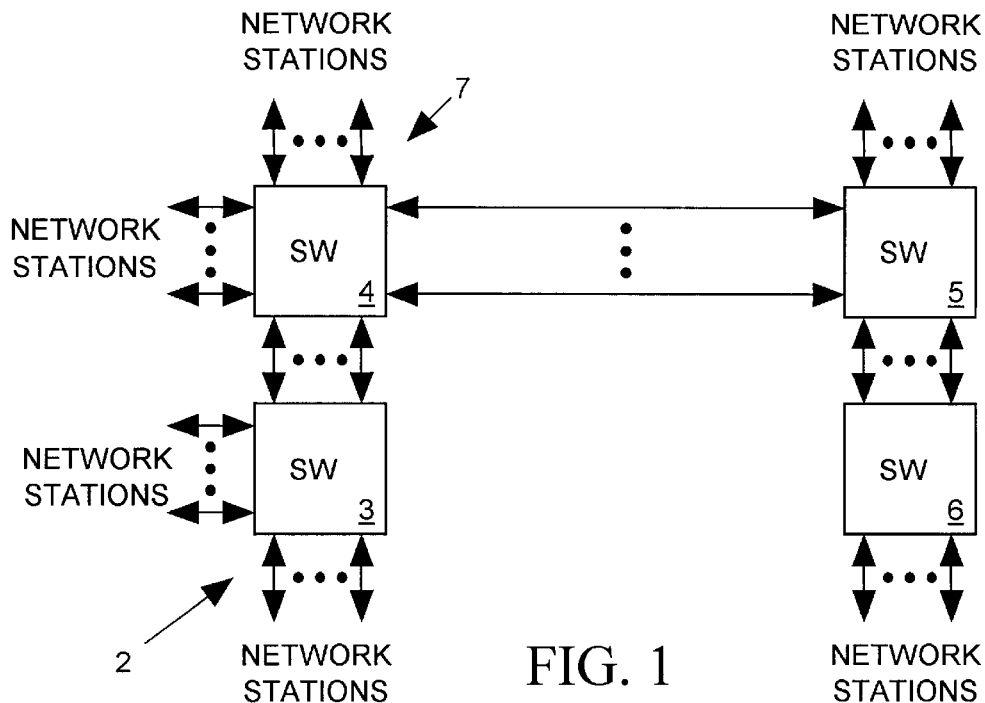
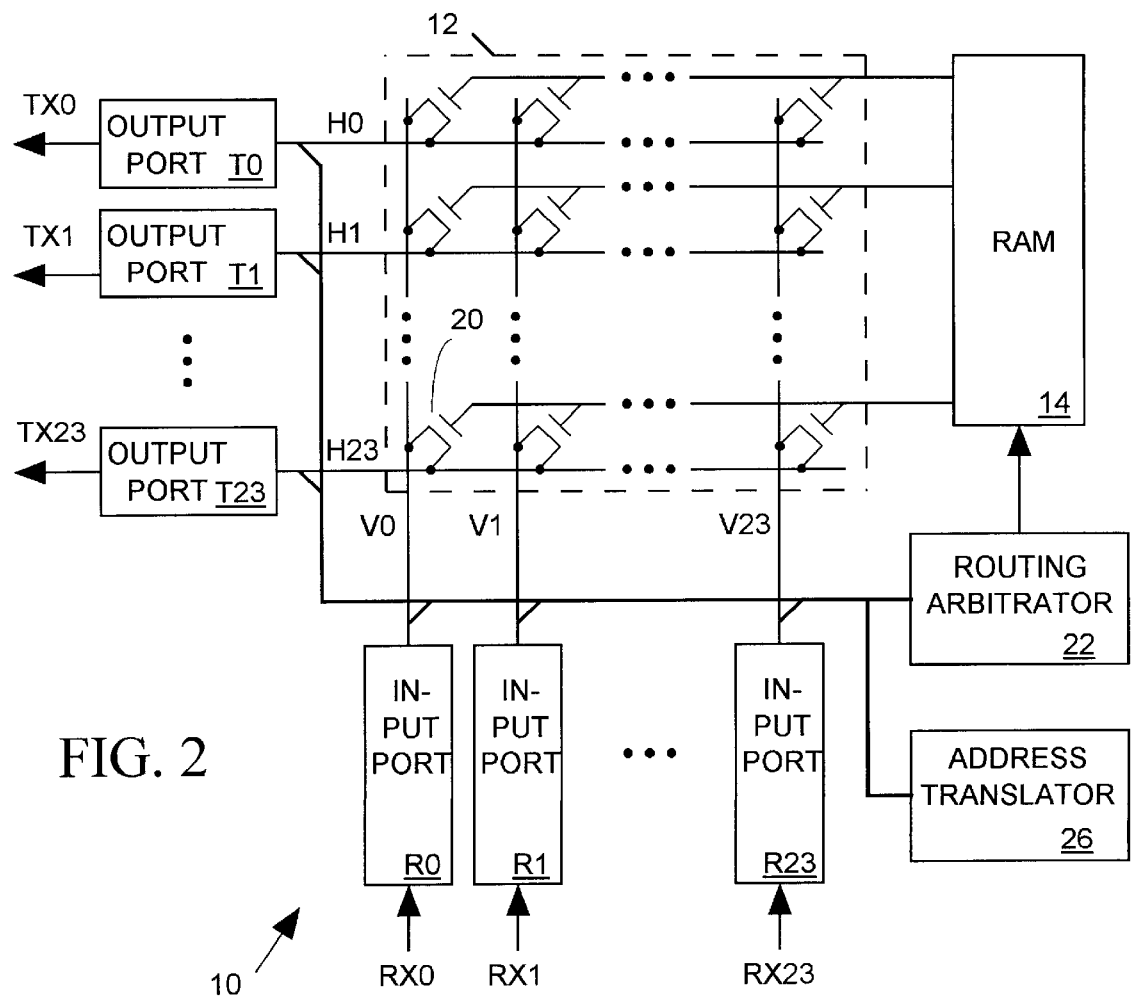

NETWORK SWITCH WITH HEAD OF LINE INPUT BUFFER QUEUE CLEARING

CROSS-REFERENCE TO RELATED APPLICATIONS

The following copending U.S. applications and issued U.S. Pat. Nos. (incorporated by reference) include related subject matter: application Ser. No. 09/097,177, tiled Jun. 12, 1998 entitled DYNAMIC PORT MODE SELECTION FOR CROSSPOINT SWITCH; application Ser. No. 09/258, 183, filed Feb. 25, 1999 entitled MODULAR NETWORK SWITCH WITH PEER-TO-PEER ADDRESS MAPPING COMMUNICATION; application Ser. No. 09/258,182, filed Feb. 25, 1999 entitled NETWORK SWITCH WITH ZERO LATENCY FLOW CONTROL; U.S. Pat. No. 6,208,644, filed Mar. 12, 1998 and issued March 27, 2001 to PANNELL et al; U.S. Pat. No. 5,940,596, filed Aug. 4, 1997 and issued Aug. 17, 1999 to RAJAN et al; and U.S. Pat. No. 6,212,194, filed Aug. 5, 1998 and issued Apr. 3, 2001 to HSIEH.

BACKGROUND OF THE INVENTION

1. Field of the Invention

The present invention relates in general to a network switch for storing data transmissions from network station source in input buffer queues and then routing them to their network destination stations when a routing path is available, and in particular to a network switch that automatically clears a data transmission from the head of a buffer queue when the queue is full.

2. Description of Related Art

In a computer network, such as an Ethernet network, the various network stations may be linked to one another through a network switch, or through a matrix of interlinked network switches. Each network switch has several input and output ports for receiving and forwarding data transmission and each input port may be linked to a network station or to a port of another network switch. A typical network switch also includes a crosspoint switch or other routing device which selectively routes packets between the network switch's input and output ports. Each network station has a unique network address, and when a network station sends a data transmission to another network station it includes a header in the transmission containing the network address of the network station to receive the transmission. When an input port of a network switch receives an incoming transmission, it stores the transmission in an input buffer queue, reads the destination address from the header and determines where the packet is to be sent. The input port then sends a connection request to a switch arbiter requesting a connection through the crosspoint switch to the particular output port that can forward the packet to the addressed destination station. The arbiter grants the request by establishing a connection through the crosspoint switch and then signaling the input port to forward the data transmission to the output port. The output port stores the packet in an output buffer and then forwards the packet to the destination station.

An input port's buffer can receive data faster than it can forward it, at least until the buffer fills up. For example the packet at the head of an input port's buffer queue may be destined for a switch output port that is busy receiving transmissions from other ports. Thus the input port, which forwards transmissions from its queue in the order received is blocked from forwarding any transmissions until the busy output port is ready to receive the packet at the head of the input port's queue. In the meantime the input port has continue storing all incoming packets in its buffer queue. Eventually, if the output port is blocked for a long enough period of time, the input buffer queue will fill up and will have to discard incoming packets.

Conventional network flow control systems help to prevent loss of packet data by slowing the flow of data into the buffer. When a buffer in a network path is nearly full, the buffer may send flow control data back to network devices that send it data packets telling them to either halt or slow further packet transmissions. One difficulty with such a flow control system is that its takes time for the flow control data to reach the transmitting network stations and for the transmitting stations to reduce the flow of data packets into the overloaded buffer. Until the transmitting stations receive and process the flow control data, those network stations continue to transmit data at a rate which can overflow the receiving port's buffer. Also, when the rate at which data is sent to the buffer is too low, it takes time for the buffer to send flow control data to the transmitting stations telling them that they may speed up data transmissions. In the interim, system bandwidth can be under utilized.

SUMMARY OF THE INVENTION

The present invention relates to a network switch having a set of input ports for receiving data transmissions from network stations, a set of output ports forwarding data transmissions to network stations, a crosspoint switch for routing data transmissions from each input port to a selected output port, and a routing arbitrator for controlling the crosspoint switch. When an input port receives a data transmission it stores it in an input buffer queue that can store several data transmission in the order they are received. When the transmission reaches the head of the queue, the input port sends a request to the routing arbitrator requesting a connection through the crosspoint switch to a destination output port that is to forward the transmission to a network station. The routing arbitrator thereafter grants the connection request by commanding the crosspoint switch to establish a data path from the requesting input port to the requested output port and then signaling the input port to forward the data transmission from the head of its input buffer queue to the destination output port. When an output port is busy receiving data transmission from other ports, the input port's buffer queue can fill up with incoming data transmissions waiting to be forwarded.

In accordance with the invention, when an input port's buffer queue is nearly full, the buffer queue discards the data transmission at the head of the queue in order to make room for new incoming packets to be stored in the queue. Thus the longest-stored data packet, rather than incoming data packets, is discarded when an input buffer fills up.

This "head of line" buffer clearing approach has advantages over prior art systems that allow incoming data transmission to be lost when an input buffer queue fills up. First, a network station that does not receive an acknowledgment that a data packet has been received will typically retransmit the packet to the intended destination.

Thus the longest stored data transmission in an input queue is the transmission most likely to have a replacement data transmission already on route to the destination station.

Secondly by discarding the packet at the head of the input buffer queue we solve the flow control problem at its source and allow the buffer queue to resume forwarding packets to other switch output ports that are not blocked.

On the other hand, no matter how many packets arriving at the front of the queue are discarded, discarding such incoming packets in accordance with prior art flow control systems does nothing to solve the blockage problem at the front of the queue.

It is accordingly an object of the invention to provide an effective means for un-blocking data transmissions from a buffer queue of an input port of a network switch.

It is another object of the invent to prevent loss of the most recent packets to arrive at an input buffer queue of a network switch port when the queue is full such that all packets that can go out to uncongested ports can do so.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 illustrates a computer network employing a set of network switches in accordance with the present invention for routing data packets between various network stations, FIG. 2 illustrates in block diagram form a network switch suitable for implementing any one of the network switches of FIG. 1.

DESCRIPTION OF THE PREFERRED EMBODIMENTS

Network Topology

Figure 3:
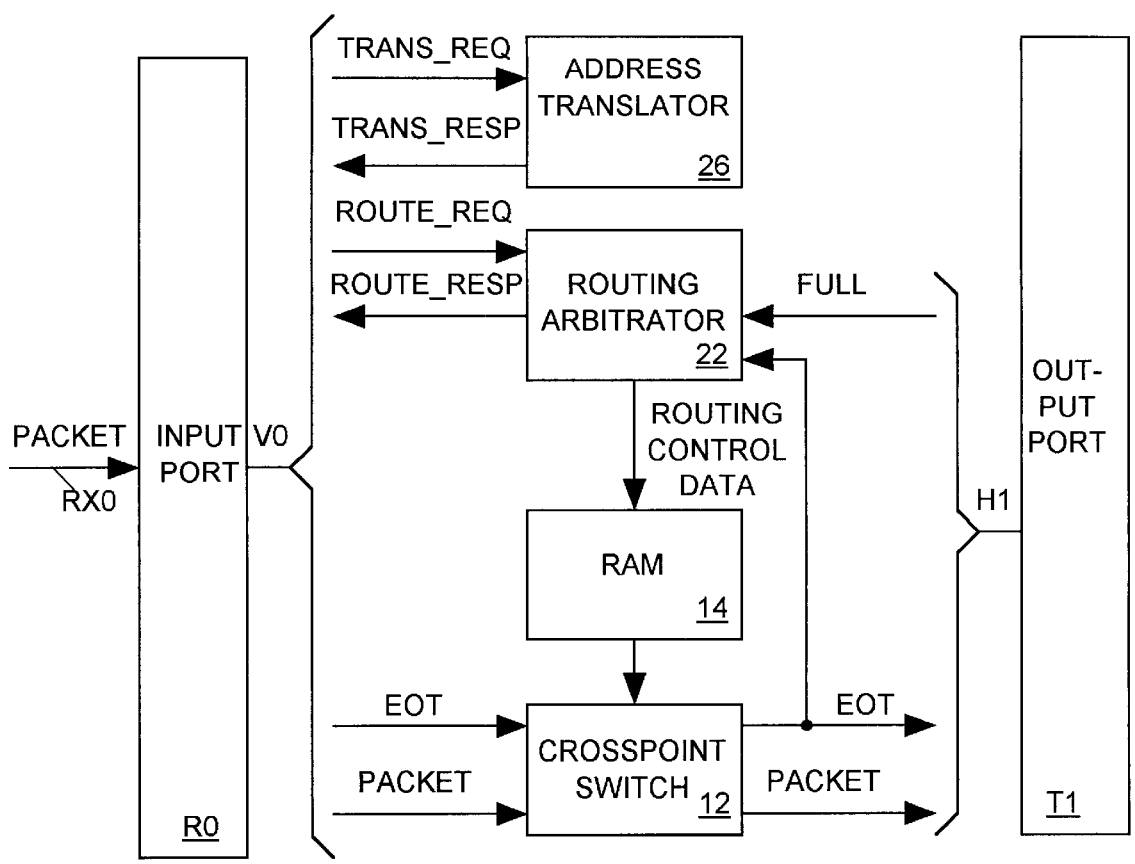
FIG. 3 illustrates data flow within the network switch of FIG. 2.

FIG. 1 illustrates a computer network 2 employing a set of network switches 3–6 to route data packets between variouts network stations. Each network switch 3–6 includes a set of input/output ports 7, each input/output port linking the network switch to one or more network stations or to an input/output port 7 of another network switch. When a network station wants to send a data packet to another network station, it forwards the data packet to an input port of one. of network switches 3–6. The data packet includes the network address of the destination station to receive the packet. When the destination station is connected to an output port of the network switch (the transmission "sources" switch) that received the packet from its source station, the source switch forwards the packet directly to the destination station. On the other hand, when the transmission's destination station is connected to a switch (a "destination" switch) other than the source switch, the source switch forwards the packet to the destination switch possibly via an intervening network switch. Network 2 can be easily expanded by connecting input/output ports of additional network switches to input/output ports of various existing switches.

Network Switch Architecture

FIG. 2 illustrates a network switch 10 suitable for implementing any one of switches 3–6 of FIG. 1. Network switch 10 includes a set of 24 input/output (I/O) ports R0/T0–R23/T23. Each input port portion R0–R23 of an I/O port receives incoming packets arriving on a corresponding one of input buses RX0–RX23, while each output port portion T0–T23 of an I/O port transmits packets outward on a corresponding one of output buses TX0–TX23. A crosspoint switch 12 routes data packets from input ports R0–R23 to appropriate output ports T0–T23. Switch 12 includes a set of 24 "vertical" conductors V0–V23, each connected to a corresponding one of input ports R0–R23 and a set of 24 "horizontal" conductors H0–H23, each connected to a corresponding one of output ports T0–T23. Switch 12 also includes a set of pass transistors 20 controlled by data stored in a random access memory (RAM) 14. Each pass transistor 20 can selectively interconnect one of horizontal lines H0–H23 to one of vertical lines V0–V23. Transistors 20 are arranged so that, depending on the data stored in RAM 14, data can be routed through switch 12 from any input port R0–R23 to any output port T0–T23 with any number of data paths through switch 12 being concurrently active. A routing arbitrator 22 establishes and removes routing paths through switch 12 by writing data to RAM 14 in response to routing requests from the input ports R0–R23. As discussed below, an address translator 26 relates the destination address of each arriving data transmission to an I/O port that can forward the transmission to its destination. Translator 26 provides ports T0–T23 with the destination port IDs they need to properly route transmissions through the switch.

Each output port T0–T23 includes a buffer for storing data packets received from input ports R0–R23 until the output port can send them outward via its output line TX0–TX23. After receiving a data packet, each output port T0–T23 signals routing arbitrator 22 if its buffer is too full to receive another packet. Thereafter routing arbitrator 22 refrains from routing any more packet traffic to that output port. When the output port thereafter has forwarded a sufficient amount of packet data from its buffer, it signals routing arbitrator 22 that its buffer is no longer full. Thereafter routing arbitrator 22 resumes routing packet data to that output port.

FIG. 3 illustrates data flow within network switch 10 of FIG. 2 between input port R0, routing arbitrator 22, address translator 26, RAM 14 and switch 12. When, for example, input port R0 receives an incoming data packet addressed to a network station linked, for example to output port T1, it stores the packet in an internal buffer memory and sends a translation request (TRANS_REQ) containing the network destination address included in the packet to address translator 26 via vertical line V0. Each switch I/O port has a unique identification number (ID) from 0 to 23. Address translator 26 maintains a data base relating each network address to the ID of the switch port accessing the network station identified by that network address. On receiving the network destination address, address translator 26 returns (via line V0) a translation response (TRANS_RESP) containing the corresponding port ID (1) to input port R0. Input port R0 then sends (via line V0) a routing request (ROUTE_REQ) to routing arbitrator 22. Output port T1 communicates with routing arbitrator 22 via a FULL signal conveyed on line H1 to indicate whether its buffer is full, unable to store another data packet from an input port.

When the requested output port T1 is busy receiving a data packet from another input port (not shown in FIG. 3) via crosspoint switch 12 or is asserting the FULL signal, routing arbitrator 22 stores the request and waits until output port T1 becomes idle and has deasserted the FULL signal to indicate that its buffer is not full. At that point routing arbitrator 22 writes routing control data to RAM 14 to establish the connection through crosspoint switch 12 between input port R0 and output port T1. Routing arbitrator 22 then sends a connection response (ROUTE_RESP) to input port R0 indicating that it may begin forwarding the packet to output T1 via crosspoint switch 12. Input port R0 then begins reading the packet from its buffer and forwarding it to output port T1 via switch 12.

After sending the last byte of the packet to output port T1, input port R0 sends an end of transmission (EOT) code outward on line V0 to routing arbitrator 22, and then tristates the V0 line. The EOT code also travels to output port T1 via switch 12. Routing arbitrator 22 responds to the EOT code by writing data into RAM 14 breaking the switch 12 connection between input port R0 and output port T1. If the packet buffer in output port T1 is so full that it cannot store another maximum size packet, then on receiving the EOT code, it asserts the FULL signal by pulling down the H1. Conversely, if its packet buffer is not full, output port T1 simply tristates the H1 line and allows an internal pull-up resistor to weakly pull the H1 line up. This tells routing arbitrator 22 that the output port is now idle and ready to receive a new packet.

Head of Line Input Port Buffer Queuing

When transmissions to line H1 or a full buffer in output port T1 prevent routing arbitrator 22 from establishing a connection between pots R0 and T1 though switch 12, the input port's input buffer queue may fill up with packets arriving via incoming bue RX0. In accordance with the invention, when an input port's buffer queue is nearly full, the buffer queue discards the data transmission at the head of the queue in order to make room for new incoming packets to be stored in the queue if the head of line packet cannot be forwarded. This un-blocks input port R0 and allows it to resume forwarding transmissions to other output ports that may be ready to receive data transmissions.

This "head of line" buffer clearing approach has advantages over prior art systems that allow incoming data transmission to be lost when an input buffer queue fills up. First, a network station that does not receive an acknowledgment that a data packet has been received will typically retransmit the packet to the intended destination. Thus the longest stored data transmission in an input queue is the transmission most likely to have a replacement data transmission already on route to the destination station. Secondly by discarding the packet at the head of the input buffer queue we solve the flow control problem at its source and allow the buffer queue to resume forwarding packets to other switch output ports that are not blocked. On the other hand, no matter how many packets arriving at the front of the queue are discarded, discarding such incoming packets in accordance with prior art flow control systems does nothing to solve the blockage problem at the front of the queue. By discarding the longest stored packets that are most likely to have been considered "stale" and already replaced by their source stations, the present invention provides an effective means for un-blocking data transmissions from an input port in which only packets least likely to be needed are discarded.

Input Port

Figure 4:
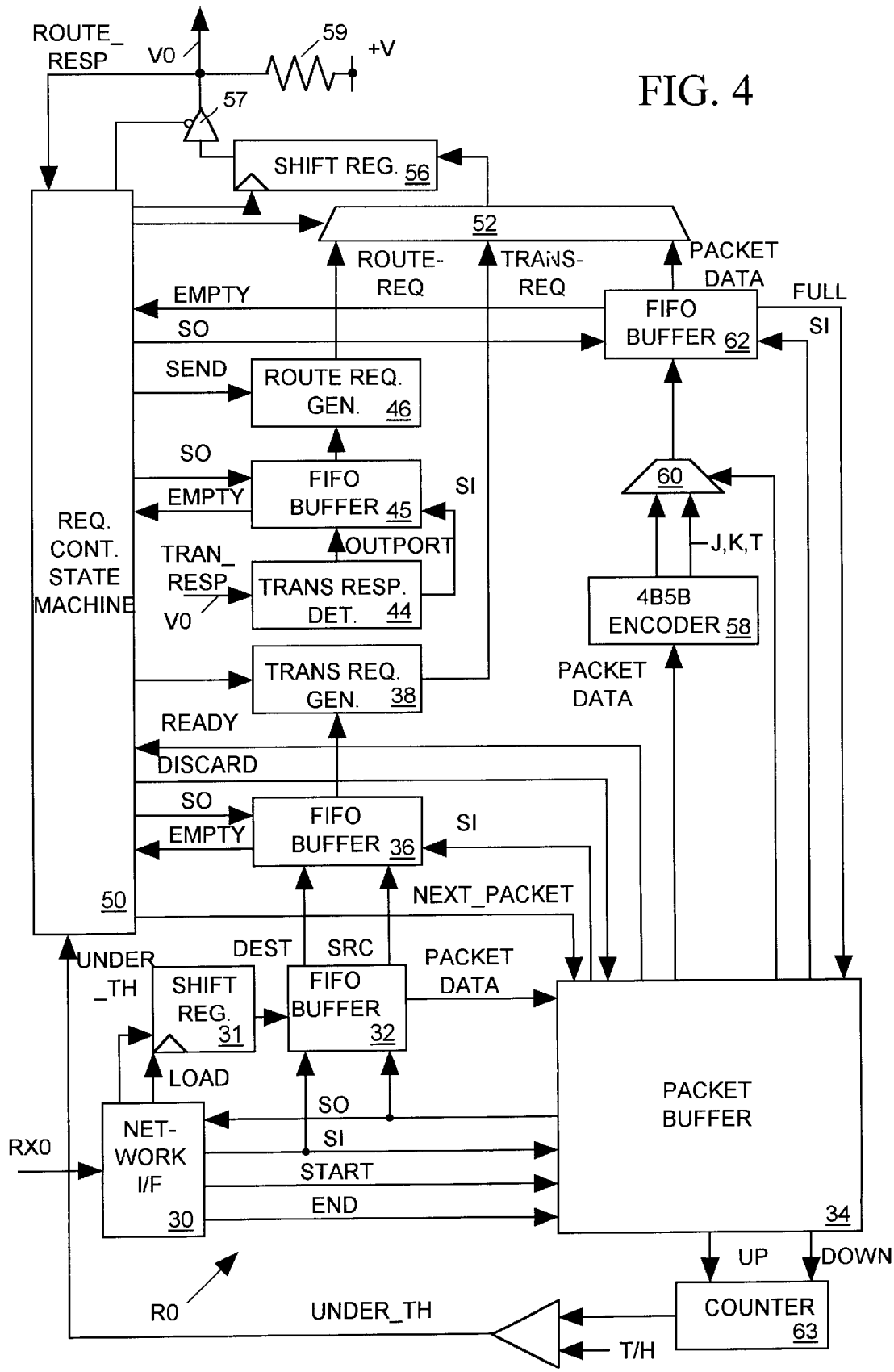
FIG. 4 illustrates a typical input port of FIG. 2 in more detailed block diagram form.

FIG. 4 illustrates the input port R0 portion of I/O port R0/T0 of FIG. 2 in more detailed block diagram form. Input ports R1–R23 are similar. A network station transmits a data packet to input port R0 in serial form via bus RX0 using Ethernet protocol. The data packet, formatted as a standard Ethernet protocol data unit, is of variable length and includes the fields illustrated in Table I:

TABLE I

| Field | Field Length | Purpose |
| --- | --- | --- |
| PREAMBLE | 7 bytes | Used for synchronizing |
| START | 1 byte | Start of frame delimiter |
| DEST | 6 bytes | Destination Network address |
| SRC | 6 bytes | Source Network address |
| TYPE/LEN | 2 bytes | Type or Length of data field |
| DATA | 46–1500 bytes | Data field |
| CRC | 4 bytes | Frame check field |

The DEST field indicates the network address of the station to receive the packet. The SRC field indicates the network address of the station that transmitted the packet. The TYPE/LEN field may indicate either a packet type or the length of the DATA field, depending on the particular version of Ethernet protocol in use. The DATA field holds the packet payload data and may be from 46 to 1500 bytes long. The CRC field is a frame check field used by the receiving station to determine whether the packet has been corrupted in transmission. While Table I illustrates a typical packet structure, the present invention may be easily adapted to handle other packet structures.

Referring to FIG. 4, a conventional Ethernet network interface circuit 30 receives the incoming packet arriving in serial fashion on input line RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO port to store the nibble. Interface circuit 30 continues to load each successive nibble of the data packet into FIFO buffer 32.

When the longest-stored nibble in FIFO buffer 32 is the first nibble of a data packet following the preamble, network interface circuit 30 transmits a START signal to a packet buffer 34. On receipt of the START signal, packet buffer 34 begins pulsing a shift-out signal (SO), each pulse causing FIFO buffer 32 to shift out a 4-bit data nibble to the packet buffer 34 which stores them internally. Network interface circuit 30 counts the nibbles of each packet it loads into FIFO buffer 32 and also counts pulses of the SO signal produced by packet buffer 34 to determine how many nibbles packet buffer 34 has stored. After interface circuit 30 shifts the last nibble of a packet into FIFO buffer 32, it continues to count the number of nibbles the packet buffer 34 receives and sends an END signal to packet buffer 34 to tell it that it has acquired and stored the last nibble of the packet.

As it loads packet data into FIFO buffer 32, interface circuit 30 determines from its nibble count when the data packet's source and destination fields (SRC and DEST) appear in FIFO buffer 32. At that point network interface 30 pulses a shift in signal causing a FIFO buffer 36 to store the SRC and DEST fields. When FIFO buffer 36 is not empty it reasserts an EMPTY output signal supplied to a request control state machine 50. State machine 50 monitors the EMPTY signal and when the EMPTY signal is deasserted, and input port R0 is not currently forwarding a data packet via the V0 line, state machine 50 transmits an SO signal to FIFO buffer 36 causing it to shift out its longest stored SRC and DEST fields to a translation request generator 38. Translation request generator 38 converts the SRC and DEST fields into an encoded translation request (TRANS_REQ) and, under control of state machine 50, forwards the TRANS_REQ through a multiplexer 52 to a parallel-in, serial-out shift register 56. State machine 50 then serially shifts the translation request out of shift register 56 onto line V0. Address translator 26 of FIG. 2 monitors the V0 line for encoded translation requests, and when it detects a translation request, it reads the address information it conveys and returns an encoded translation response via line V0 to the requesting input port R0. The translation response includes the ID of the switch output port (one of output ports T0–T23) to which the packet should be directed.

As seen in FIG. 4, the input port includes a translation response detector 44 that monitors the V0 line. When a translation response arrives on the V0 line, the translation response detector extracts the output ID (OUTPORT) from the translation response and loads it into a FIFO buffer 45. The longest-stored logical port ID in FIFO buffer 45 is supplied to a connection request generator circuit 46. FIFO buffer 45 also asserts an EMPTY signal input to state machine 50 when it is empty. When it sees that the EMPTY signal is de-asserted, indicating a connection request is pending, state machine 50 pulses a SEND signal causing request generator. 46 to produce a connection request R0UTE_REQ in the form of a sequence of 5-bit data values. The connection request R0UTE_REQ contains the output port ID longest stored in FIFO buffer 45. State machine 50 routes the connection request through multiplexer 52 to shift register 56. Shift register 56 converts the sequence of 5-bit data values to a serial data stream and forwards it on line V0 to routing arbitrator 22. It thereafter tristates the V0 line via a tristate buffer 57. A pull-up resistor 59 then weakly pulls the V0 line up.

When routing arbitrator 22 of FIG. 2 thereafter determines that it is able to grant the routing request, it establishes the requested connection through switch 12 and then pulls down on the V0 line briefly to send a routing response (R0UTE_RESP) to state machine 50 of input port R0 indicating that the connection has been granted. State machine 50 responds to the CON_RESP pulse by switching multiplexer 52 to receive packet data (DATA) from a FIFO buffer 62 and transmitting a NEXT_PACKET signal to packet buffer 34 indicating it may begin forwarding the longest-stored packet out of its memory.

Packet buffer 34 then switches a multiplexer 60 to receive a hardwired 5-bit code "J", shifts the "J" code output of multiplexer 60 into FIFO buffer 62, switches multiplexer 60 to select a hardwired "K" code and then shifts the "K" code output of multiplexer 60 into a FIFO buffer 62. (As explained below, the JK code sequence marks the beginning of a data packet transmission on output line V0. ) Thereafter, packet buffer 34 switches multiplexer 60 to select the 5-bit data output of a "4B5B" encoder circuit 58. As explained below, encoder 58 converts an input 4-bit packet data nibble to 5-bit "4B5B" encoded form. Packet buffer 34 then begins sequentially reading 4-bit packet data nibbles to encoder 58. As encoder 58 converts the nibbles to 5-bit 4B5B encoded form, multiplexer 60 passes the 5-bit result to FIFO buffer 62. Packet buffer 34 strobes a shift in (SI) signal causing FIFO buffer 62 to load the 5-bit data values. FIFO buffer 62 produces a FULL signal telling buffer 34 when the buffer is full. The longest-stored nibble in FIFO buffer 62 appears at an input of multiplexer 52 controlled by state machine 50. When packet data is currently stored in FIFO buffer 62, buffer 62 de-asserts an EMPTY signal supplied to state machine 50. State machine 50 then shifts the data out of FIFO buffer 62 and into shift register 56 which converts the 5-bit data to serial form and forwards it on line V0 to switch 12 of FIG. 2. Switch 12 routes the data to the appropriate output port.

After it forwards the last nibble of the packet through encoder 58 to FIFO buffer 62, packet buffer 34 switches multiplexer 60 to select and forward to FIFO buffer 62 a 5-bit hardwired "T" code. The T code, which acts at the end of transmission (EOT) code to mark the end of the packet, passes through FIFO buffer 62, multiplexer 52 and shift register 56 and travels out on line V0 at the end of the data packet. After sending the end of transmission code, packet buffer 34 sends a READY signal to state machine 50. If packet buffer 34 contains another packet, FIFO buffer 36 will signal state machine 50 that it is not empty. If so, state machine 50 starts the process of sending that packet to the appropriate output port by initiating another address translation request.

4B5B Encoding

Translation and connection requests and responses and data packets are conveyed on the same I/O line V0 of input port R0 to reduce the number of links to the input port. Connection requests and data packets are "4B5B" encoded to enable routing arbitrator 22, address translator 26 and the output ports to determine when translation and connection requests and data packets begin and end. Consistent with the ANSI standard X379(FDDI) "4B5B" encoding. system, encoder 58 converts each incoming 4-bit nibble into a 5-bit output value as illustrated in Table II.

TABLE II

| NIBBLE | 4B5B |
|---|---|
| 0000 | 11110 |
| 0001 | 01001 |
| 0010 | 10100 |
| 0011 | 10101 |
| 0100 | 01010 |
| 0101 | 01011 |
| 0110 | 01110 |
| 0111 | 01111 |
| 1000 | 10010 |
| 1001 | 10011 |
| 1010 | 10110 |
| 1011 | 10111 |
| 1100 | 11010 |
| 1101 | 11011 |
| 1110 | 11100 |
| 1111 | 11101 |

Since only 16 of the 32 possible combinations of the five bits of the 4B5B code are needed to represent the sixteen possible values of a 4-bit nibble, the remaining 16 combinations of 4B5B code are available for other purposes. Table III below lists how the network switch of the present invention uses the remaining 16 4B5B codes.

TABLE III

| 4B5B | NAME | FUNCTION |
|---|---|---|
| 00000 | Q | TRANS_REQ Start |
| 11111 | I | Idle |
| 00100 | H | No Operation |
| 11000 | J | Packet Start 1 |
| 10001 | K | Packet Start 2 |
| 01101 | T | End of Packet |
| 00111 | R | No Operation |
| 11001 | S | No Operation |
| 00001 | V | Violation |
| 00011 | V | Violation |
| 00010 | V | Violation |

TABLE III-continued

| 4B5B | NAME | FUNCTION |
|---|---|---|
| 00101 | V | Violation |
| 00110 | V | Violation |
| 01000 | V | Violation |
| 01100 | V | Violation |
| 10000 | CR | ROUTE_REQ Start |

The CR code is used to identify the start of a routing request. The Q code is used to identify the start of a translation request. The R and S codes are ignored when they appear in a 4B5B encoded data stream. The I, J, K and V codes are used to synchronize transmission and receipt of 4B5B encoded data streams in the manner described below. The T code is used as the end of transmission (EOT) code to indicate the end of a 4B5B encoded data packet or translation requests.

Buffer Clearing

Packet buffer 34 arranges its buffer memory into a set of memory units or cells which can hold a set number of bytes of pocket data. In accordance with the present invention, input port R0 includes a counter 63 for maintaining a count indicating the number of packet buffer cells that are available for storing incoming packet data. Packet buffer 34 sends an DOWN signal to counter 63 whenever it fills a memory cell and sends an UP signal to counter 63 whenever it empties a memory cell. A computer 64 monitors the output count of counter 63 and generates an output signal UNDER_TH when the available cell count falls below a threshold level that is equal to the number of cells needed to store the largest size packet that may be transmitted to port R0 via bus RX0. If packet buffer 34 is not currently transmitting a packet, state machine 50 responds to the UNDER_TH signal by sending a DISCARD signal to packet buffer 34 telling it to discard its longest stored packet. Packet buffer responds by discarding the packet. It does this by simply freeing all of the cells that store that packet, without actually forwarding the packet to encoder 58, and sending a pulse of the UP signal to counter 63 for each cell that becomes available.

State machine 50 also responds to the UNDER_TH signal by signaling FIFO BUFFER 46 to shift out its longest-stored output port ID and by signaling request generator 46 to send a routing request for the packet now at the head of the queue in packet buffer 34. Before responding to the new routing request, routing arbitrator 22 (FIG. 2) responds to the new routing request by discarding any pending routing quest from port R0.

Output Port

Figure 5:
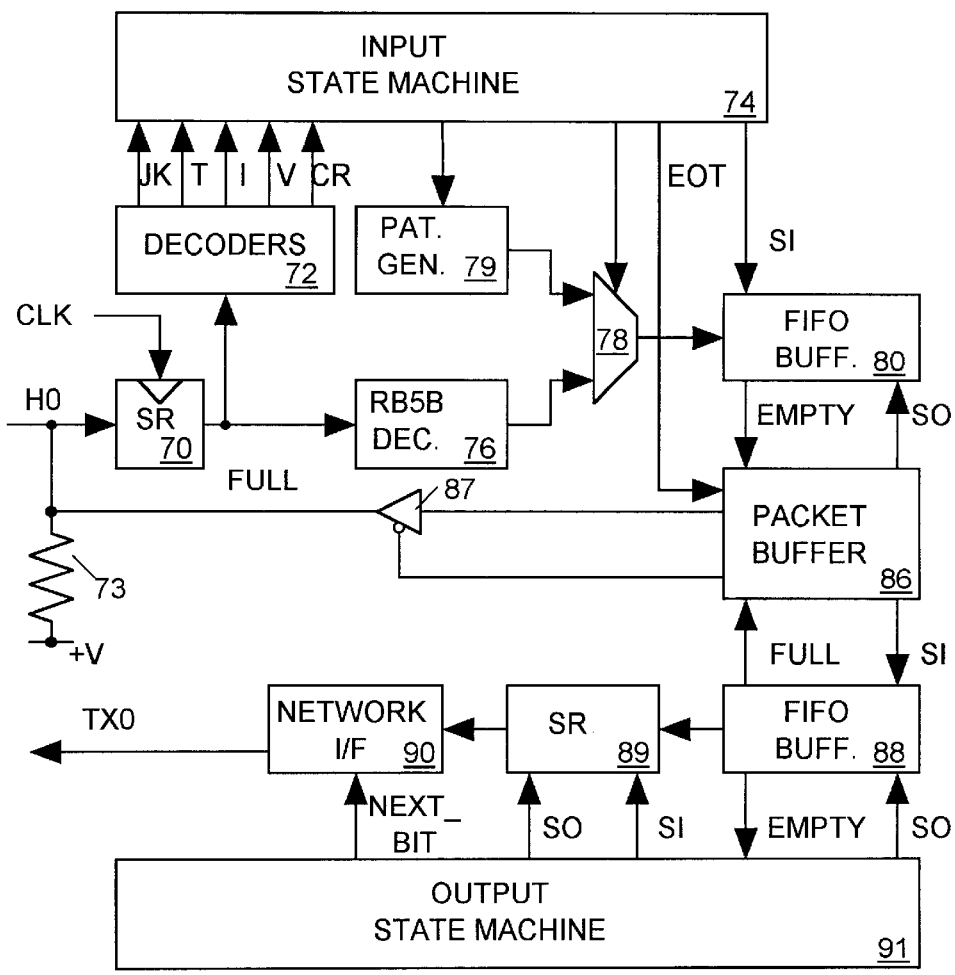
FIG. 5 illustrates a typical output port of FIG. 2 in more detailed block diagram form.

FIG. 5 illustrates the output port T0 portion of I/O port R0/T0 of FIG. 2 in more detailed block diagram form. Output ports T1–T23 are similar. Output port T0 includes a 10-bit serial-in, parallel-out shift register 70 clocked by the system clock signal CLK for receiving and storing data bits appearing on the H0 line. A resistor 73 weakly pulls up on the H0 line when it is not other wise being controlled by an input port or other device to which it is connected. A set of decoders 72 signals an input state machine 74 when the first five data bits stored in shift register 70 represent the I, V, T or CR 4B5B codes of Table II above or when all ten bits in shift register 70 represent the J and K codes in succession. A 4B5B decoder 76 converts incoming 5-bit values into corresponding 4-bit nibbles and passes them via a multiplexer 78 to the input of a FIFO buffer 80.

Figure 6:
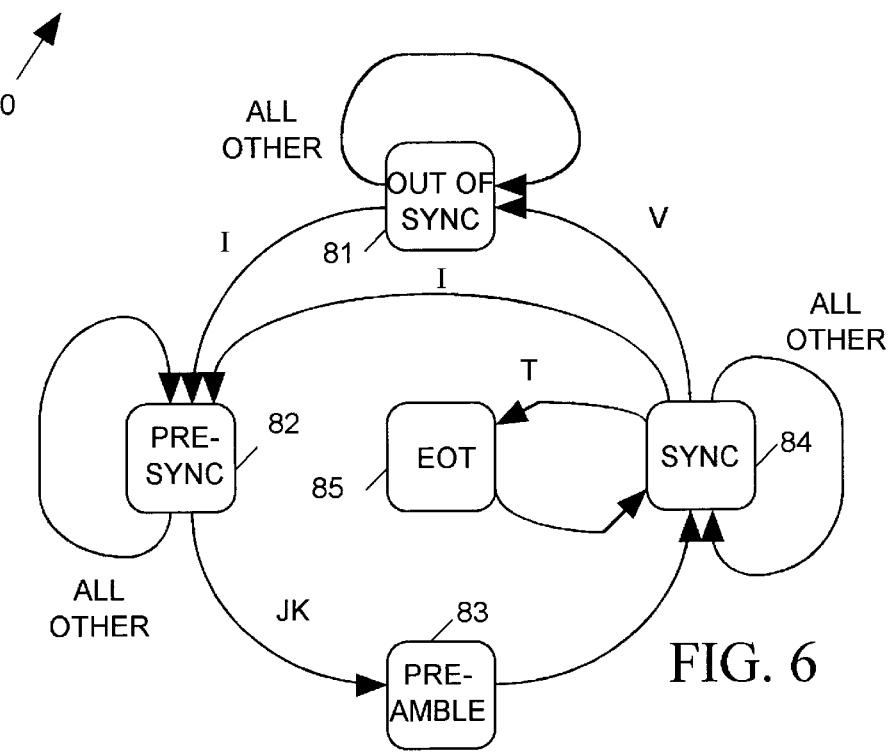
FIG. 6 is state diagram illustrating a synchronization process carried out by the input state machine of FIG. 5.

FIG. 6 is state diagram illustrating a synchronization process carried out by input state machine 74 of FIG. 5.

Input state machine 74 begins in an "out-of-synchronization" state 81. State machine 74 remains in state 81 until decoder 72 detects the idle symbol I. At that point state machine 74 moves to a "pre-synchronization" state 82. When decoder 72 signals detection of successive J and K symbols (indicating start of a data packet) state machine 74 switches to a "load pattern" state 83 wherein it switches multiplexer 78 to select the output of a pattern generator 79. Pattern generator 79 produces the network protocol PREAMBLE field for the data packet, which is the same for all data packets. As pattern generator 79 produces the PREAMBLE field, state machine 74 shifts it into FIFO buffer 80. Thereafter, state machine 74 switches multiplexer 78 to select the output of decoder 76. It then moves to state 84 of FIG. 6 wherein asserts an SI signal on every 5th pulse of the system clock signal. If decoder 72 detects the I code state machine 74 reverts to its pre-synchronization state 82. If a decoder 72 detects the end of transmission code T, state machine 74 switches to state 85 to send an EOT signal pulse to a packet buffer 86 and then returns to state 84. If a decoder 72 detects the V code state machine 74 reverts to out-of-synchronization state 81.

Referring again to FIG. 5, when FIFO buffer 80 signals it is not empty, packet buffer 86 shifts data out of FIFO buffer 80 and stores it in an internal random access memory (RAM). When FIFO buffer 80 drives the EMPTY signal high after state machine 74 has pulsed the end of packet signal EOT, packet buffer 86 assumes it has received and stored the entire packet. At this point, if packet buffer 86 is too full to accept another packet, it enables a tristate buffer 87 and tells it to pull down the H0 line. As long it holds the H0 line low, routing arbitrator 22 of FIG. 2 will refrain from routing another packet to output T0.

When packet buffer 86 is storing at least one fully assembled packet, it begins shifting nibbles of the packet into a FIFO buffer 88. Packet buffer 86 monitors a FULL signal produced by FIFO buffer 88 and suspends loading data into buffer 88 when it is full. The longest-stored nibble in FIFO buffer 88 is supplied to a 4-bit parallel-in/serial-out shift register 89. The serial output of shift register 89 passes to a conventional network interface circuit 90 which forwards each bit to the receiving network station via the TX0 bus. When it forwards a bit to the TX0 bus, interface circuit 90 signals an output state machine 91 and state machine 91 signals shift register 89 to shift out a bit. When a 4-bit nibble has been shifted out of register 89, state machine 91 checks an EMPTY signal produced by FIFO buffer 88. If FIFO buffer 88 is not empty, state machine 91 shifts a next nibble of the packet out of FIFO buffer 88 and shifts it into shift register 89. When FIFO buffer 88 is full it asserts its FULL signal output causing packet buffer 86 to refrain from sending any more packet nibbles to FIFO buffer 88 until buffer 88 deasserts the FULL signal.

When packet buffer 86 has sufficient space to store an additional maximum size packet, it tristates buffer 87, thereby allowing resistor 73 to pull upon the H0 line. This signals routing arbitrator 22 of FIG. 2 that it may route another packet to output port T0.

Routing Arbitration

Figure 7:
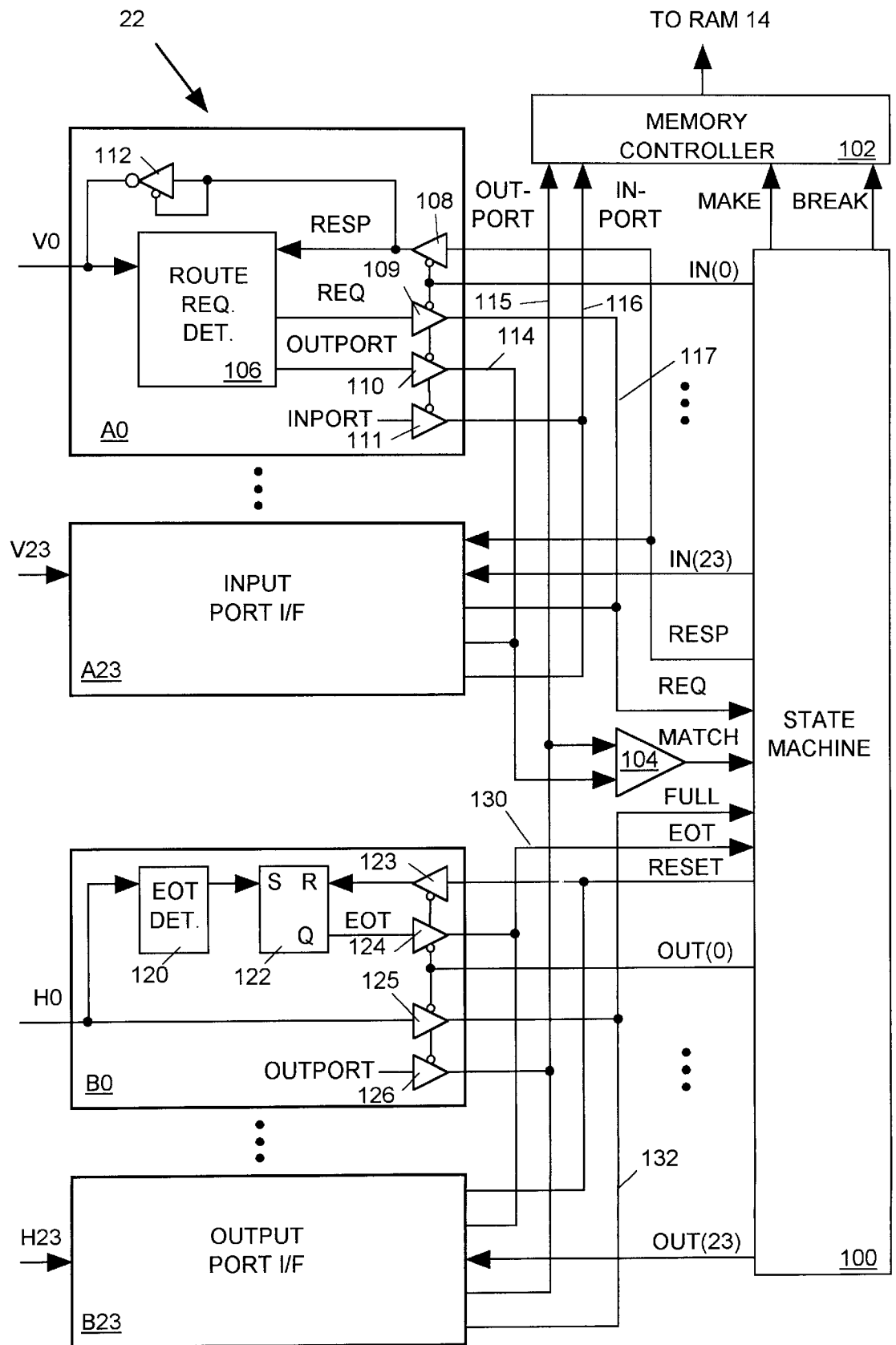
FIG. 7 illustrates the routing arbitrator of FIG. 2 in more detailed block diagram form.
Figure 8:
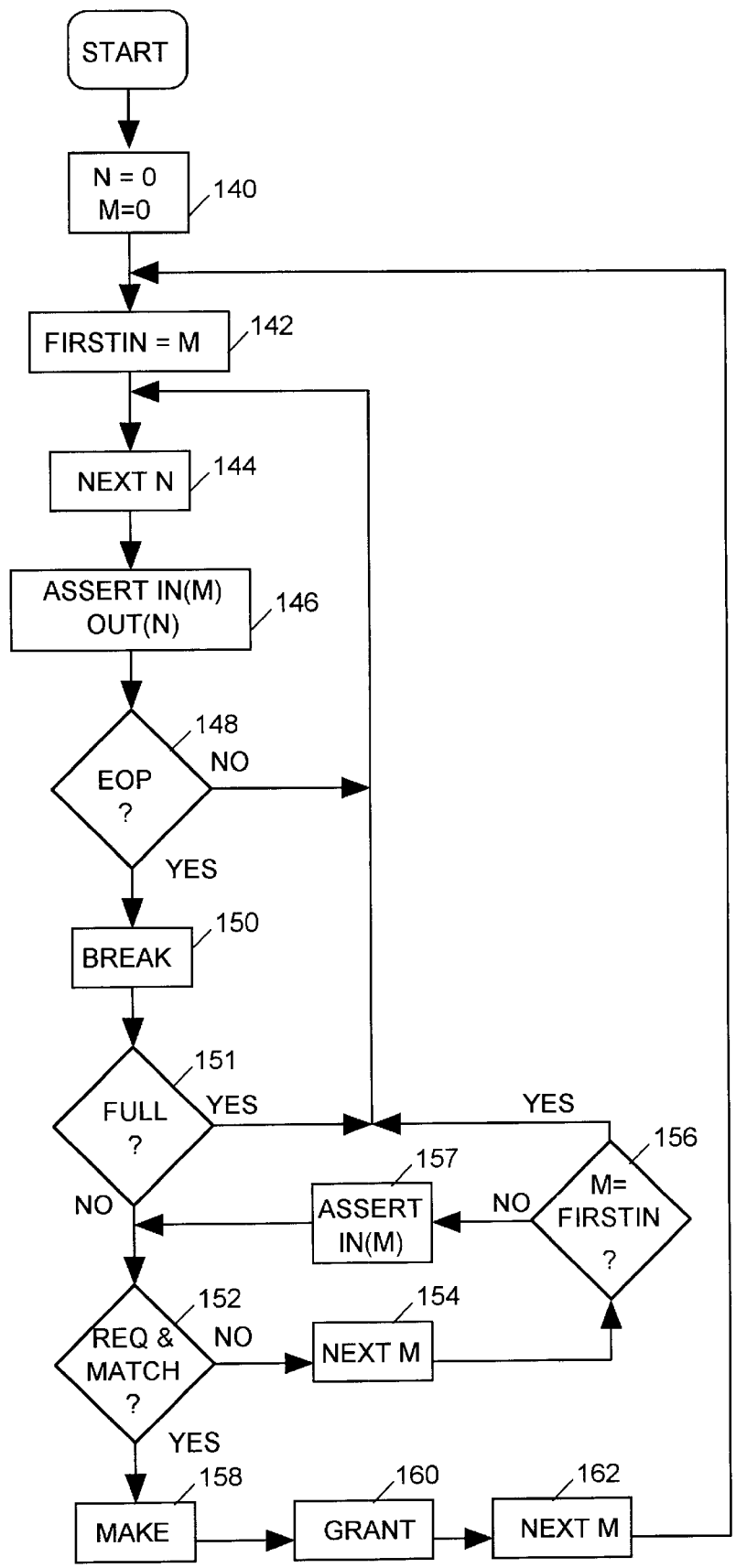
FIG. 8 is a flow chart illustrating operation of the state machine of FIG. 7.

Since more than one input port R0–R23 of FIG. 2 may concurrently request connections to the same output port T0–T23, routing arbitrator 22 is provided to arbitrate those competing demands. FIG. 7 illustrates routing arbitrator 22 of FIG. 2 in more detailed block diagram form. Arbitrator 22 includes a set of 24 input port interface units A0–A23, a set of 24 output port interface units B0–B23, a state machine 100, a memory controller 102 and a comparator 104. FIG. 8 is a flow chart illustrating the operation of state machine 100.

Memory controller 102 receives the ID (INPORT) of an input port via a bus 116 and the ID (OUTPORT) of an output port via a bus 115. When state machine 100 asserts an output MAKE signal, memory controller 102 writes data to RAM 14 of FIG. 2 causing switch 12 to make a data path connection between the input and output ports identified by the INPORT and OUTPORT IDs. When state machine 100 asserts an output BREAK signal, memory controller 102 writes data to RAM 14 causing switch 12 to break any data path connection to the output port identified by the OUTPORT ID.

State machine 100 periodically polls each output port interface circuit B0–B23 to determine if the output port it serves is ready to receive a data packet and periodically polls each input port interface circuit A0–A23 to determine if the input port it serves has a pending routing request. Comparator 104 compares the ID of polled output port with the ID of an output port requested by a polled input port and asserts a MATCH signal input to state machine 100 when the IDs match, thereby telling state machine 100 when to establish a connection between the polled input and output ports.

Each input port interface A0–A23 includes a routing request detector 106 and a set of tristate drivers 108–112. A separate one of vertical lines V0–V23 is applied as input to the routing request detector 106 of each input port interface. The routing request detector 106 looks for the code identifying a routing request appearing on the input vertical line from the input port accessing that vertical line, extracts the multiple bit ID (OUTPORT) of the output port conveyed in the routing request and supplies it as input to tristate driver 110. Driver 110, when enabled, places the requested OUTPORT ID on a multiple line bus 114 which conveys that OUTPORT ID to comparator 104. Upon detecting an incoming request detector 106 also asserts a request signal REQ applied to an input of driver 109. When driver 109 is enabled, a single line bus 117 conveys the REQ signal to state machine 100. The REQ signal tells state machine 100 when the input port has a pending connection request. The multiple bit ID (INPORT) of the input port making the request is applied as input to tristate driver 111. When enabled driver 111 places the INPORT ID on bus 116 providing input to memory controller 102. When granting a routing request from an input port, state machine 100 sends a RESP signal to the driver 108 of each input port interface A0–A23. When the driver 108 of the requesting input port interface is enabled, the RESP signal tells its routing request detector 106 to deassert its REQ signal. The RESP signal briefly enables driver 112 causing it to briefly pull down a vertical line V0–V23 thereby signaling the requesting input port that its request has been granted. State machine 100 includes a set of 24 input port polling outputs IN(0)–IN(23), each provided as the control input to the drivers 108–111 of a corresponding one of input port interface circuits A0–A23. When polling a particular one of input port interface circuits A0–A23, state machine 100 asserts the corresponding enable signal IN(0)–IN(23) to enable the interface circuit's drivers 108–111.

Each output port interface circuit B0–B23 includes an end of packet detector 120, an S/R flip-flop 122, and a set of tristate drivers 123–126. State machine 100 separately polls the output port interface circuits B0–B23 using a set of 24 output signals OUT(0)–OUT(23) to separately enable the tristate drivers 123–126 of each output port interface circuit. Each horizontal line H0–H23 of FIG. 2 is connected as input to the end of packet detector 120 of corresponding one of output port interface circuits B0–B23. When the end of packet detector 120 detects an end of transmission code on the horizontal line it sets flip-flop 122 to drive its Q output high. The Q output is applied as an end of packet signal (EOT) input to driver 124. Driver 124, enabled when state machine 100 polls one of output port interfaces B0–B23, places the EOT signal on a bus line 130 providing input to state machine 100. Tristate driver 126, when enabled, places the OUTPORT ID of the output port served by the output port interface on bus lines 115 which convey that OUTPORT ID to comparator 104 and to memory controller 102. When state machine 100 detects an asserted EOT signal, indicating that the polled output port interface circuit has received an end of transmission code, it asserts the BREAK signal, causing memory controller 102 to break the current connection to the polled output port identified by the OUTPORT ID on bus 115. If the EOT signal is not asserted, state machine 100 assumes the polled output port is busy receiving a packet and does not make any new connection to it. The horizontal line H0–H23 input to each output port interface circuit B0–B23 drives tristate driver 125. As discussed above, when the output port T0–T23 connected to the horizontal line H0–H23 has a full packet buffer, it pulls down the horizontal line. When driver 125 is enabled, it pulls down a line 132 to provide a FULL signal input to state machine 100. This tells state machine 100 not to establish a connection to the polled output port. When, upon polling a pair of input and output port interface circuits, state machine 100 detects that the EOT and MATCH signals are asserted and the FULL signal is not asserted, its asserts the MAKE signal to cause memory controller 102 to make the requested connection between the polled input and output ports. The MAKE signal also resets the flip-flop 122 of the polled output port interface circuit B0–B23 via tristate driver 124 so that the Q output of flip-flop 122 indicates that the output port is now busy.

FIG. 8 is a flow chart illustrating the operation of state machine 100 of FIG. 7. Referring to FIGS. 7 and 8, on system start up, counters N and M are set to 0 (step 140) and a variable FIRSTIN is set equal to M (step 142). (Counters N and M both overflow to 0 when incremented past 23.) State machine 100 then increments the value of N (step 144) and asserts input and output port polling signals OUT(N) and IN(M) (step 146). If the EOT signal produced by the polled output port interface circuit is not asserted (step 148) state machine 100 repeats steps 144, 146 and 148, incrementing N to poll the next output port interface circuit and checking for an asserted EOT signal. When state machine 100 detects a polled EOT signal at step 148, it asserts the BREAK signal (step 150) causing memory controller 102 to break the connection to the polled output port. Thereafter, if the FULL signal output of the polled output port interface is asserted (step 151) state machine 100 returns to step 144 to poll a next output port. When at step 151 state machine 100 detects that the FULL signal output of a polled output port interface is not asserted, it knows that the polled output port is not busy and does not have a full packet buffer. Thus (step 152) state machine 100 checks the REQ signal output of the polled input port interface circuit and the MATCH signal output of comparator 104 to determine if the polled input port is requesting a connection to the polled output port. If not, the value of M is incremented (step 154). If the value of M matches FIRSTIN (step 156, then no input port is requesting the polled output port. In such case, state machine 100 reverts to step 144 to poll a next input port. However if at step 156 M does not equal FIRSTIN, then state machine 100 asserts enable signal IN(M) (step 157) to poll a next input port and repeats step 152 to determine whether the polled input port is requesting the polled output port.

When at step 152 state machine determines that the polled input port is requesting the polled output port, it asserts the MAKE signal (step 158) to signal memory controller 102 to make the connection between the polled input and output ports. State machine 100 then pulses the RESP signal (step 160) to tell the polled input port interface circuit to send a connection response pulse back to the polled input port and to reset flip-flop 122 of the polled output port interface. After incrementing the value of M (step 162), state machine 100 returns to step 142 to reset the value of FIRSTIN to M. It then repeats the polling process to find a next grantable connection request.

Request Discarding

As previously mentioned, when the input buffer of port RX0 becomes too full, counter 63 (FIG. 4) signals packet buffer 34 to discard its longest stored packet. Route request detector 106 of FIG. 7 at that time is providing state machine 100 with a pending request for a routing path for the discarded packet. When counter 63 (FIG. 4) signals state machine 50 of the input buffer of FIG. 4 to discard that pending request, state machine 50 simply signals FIFO buffer 45 and route request generator 46 to forward a new request to routing request detector 106 of FIG. 7. This causes it to overwrite its pending connection request to supply the data for the new request to its output drivers 109 and 110, thereby discarding that pending request.

The "head of line" input buffer queue clearing approach in accordance with the invention as described has advantages over prior art systems that allow incoming data transmission to be lost when an input buffer queue fills up. First, a network station that does not receive an acknowledgment that a data packet has been received will typically retransmit the packet to the intended destination. Thus the longest stored data transmission in an input queue is the transmission most likely to have a replacement data transmission already on route to the destination station. Second, by discarding the packet at the head of the input buffer queue the invention solves the flow control problem at its source and allows the buffer queue to resume forwarding packets to other switch output ports that are not blocked. On the other hand, no matter how many packets arriving at the front of the queue are discarded, discarding such incoming packets in accordance with prior art flow control systems does nothing to solve the blockage problem at the front of the queue. The invention provides an effective means for un-blocking data transmissions from a buffer queue of an input port of a network switch and prevents loss of the most recent packets arriving at an input buffer queue of a network switch port that are destined to unblocked ports when the queue is full.

Thus has been described a network switch providing head of line buffer clearing into its input port buffers. While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for routing data transmissions of varying size ranging up to a predetermined maximum size data transmission, between network stations, the network switch comprising:

a plurality of input ports, each input port including an input buffer comprising memory units for receiving and storing OaLa transmissions from at least one of said network stations;

a plurality of output ports, each for receiving and forwarding data transmissions to at least one of said network stations; and routing means for providing a route for conveying a longest-stored data transmission in the input buffer of any one of said input ports to one of said output ports selected by said routing means, said routing means providing said route following receipt of a routing request from that one of said input ports requesting the route when the selected output port is ready to receive said longest-stored data transmission, wherein each said input port removes and discards its longest-stored data transmission in its input buffer without forwarding it to one of said output ports when an amount of said input buffer memory not currently storing a received data transmission is below a threshold level sufficient to store a data transmission of the maximum size, before said routing means establishes a route to convey said longest-stored data transmission to one of said output ports, and wherein each said input port otherwise forwards its longest-stored data transmission from its input buffer to a selected one said output ports after said routing means establishes a route thereto.

2. The network switch in accordance with claim 1 wherein said routing means comprises a crosspoint switch.

3. The network switch in accordance with claim 1 wherein each memory unit is of sufficient size to store only a fractional portion of a data transmission, and wherein each input port comprises:

counter means for maintaining a count of units its buffer memory not currently storing a portion of a data transmission, wherein said counter means increments said count said input port removes a data transmission from one of said units of buffer memory and decrements said count whenever said input port stores a data transmission in one of said units of buffer memory, the counter being incremented and decremented in proportion to a number of memory units occupied by the data transmissions removed from and stored in the buffer memory, and means for signaling said input buffer to discard said longest-stored data transmission when said count falls below said threshold level.

4. The network switch in accordance with claim 3 wherein said routing means comprises a crosspoint switch.

5. In a network switch of the type having a plurality of input ports and a plurality of output ports, wherein each input port comprises an input butter having memory space for receiving and. storing data transmissions of variable size ranging up to a predetermined maximum size arriving at the input port and for forwarding a longest-stored data transmission from said buffer to an output port when the output port is ready to receive the data transmission, a method of operating said input buffer comprising the steps of:

continuously determining an amount of input buffer memory space not currently used for storing a data transmission; and discarding said longest-stored data transmission from said input buffer without forwarding it to one of said output ports when an amount of unused input buffer memory space falls below a pre-determined threshold level sufficient to store a data transmission of said predetermined maximum size.

6. A network switch for routing data transmissions between network stations, the network switch comprising:

a plurality of input ports, each including a memory for receiving and storing incoming data transmissions from at least one of said network stations;

a plurality of output ports;

routing means for selectively providing a route for conveying data transmissions in the memory of any one of said input ports to any other of said output ports, wherein whenever any data transmission stored in an input port's memory becomes the longest-stored data transmission in that memory, that input port transmits a routing request to the routing means requesting a route for conveying that longest-stored data transmission to a selected one of the output ports, wherein each input port removes and discards a longest-stored data transmission in its memory when its memory's unused storage capacity fall below a predetermined threshold level before the routing means establishes a route for conveying the longest-stored data transmission to one of the output ports, each input port otherwise forwarding its longest-stored data transmission from its memory via the route established by the routing means, and wherein said routing means stores each routing request received from each input port, discards a currently stored request from any input port when that input port subsequently transmits another routing request to the routing means before the routing means provides a route requested by the currently stored routing request, and otherwise discards a currently stored routing request from any input port only after providing the route requested thereby.

7. The network switch in accordance with claim 6 wherein said routing means comprises a crosspoint switch.

* * * * *

UNITED STATES PATENT AND TRADEMARK OFFICE
CERTIFICATE OF CORRECTION

PATENT NO. : 6,510,138 B1
DATED : January 21, 2003
INVENTOR(S) : Donald Robert Pannell It is certified that error appears in the above-identified patent and that said Letters Patent is hereby corrected as shown below:

Column 13,
Line 66, "OaLa" should be deleted and replaced with -- data --.

Signed and Sealed this

Eleventh Day of March, 2003

JAMES E. ROGAN
*Director of the United States Patent and Trademark Office*